United States Patent [19]
Fruish

[11] 3,751,782
[45] Aug. 14, 1973

[54] THROW AWAY TIPS FOR METAL CUTTING TOOLS

[75] Inventor: Harvey Fruish, Northampton, England

[73] Assignee: Alfred Herbert Limited, Coventry, England

[22] Filed: May 12, 1971

[21] Appl. No.: 142,455

[52] U.S. Cl. ................................. 29/95 R, 29/96
[51] Int. Cl. ............................................. B23p 15/30
[58] Field of Search ................................. 29/95, 96

[56] References Cited
UNITED STATES PATENTS

| | | |
|---|---|---|
| 3,504,413 | 4/1970 | Siewert et al. ........................ 29/96 |
| 3,557,416 | 1/1971 | Jones ..................................... 29/95 |
| 2,677,170 | 5/1954 | Kuns et al. ............................ 29/95 |
| 3,137,918 | 6/1964 | Breuning ............................... 29/96 |

*Primary Examiner*—Leonidas Vlachos
*Attorney*—Holman & Stern

[57] ABSTRACT

A throw away tip for a metal cutting tool comprising a right prism of hard material, each end face of the prism having at least two identical cutting corners and being formed with a plurality of tapering recesses of V-shaped section each recess having its narrowest end adjacent one of said cutting corners of the associated end face.

7 Claims, 4 Drawing Figures

PATENTED AUG 14 1973　　3,751,782

SHEET 1 OF 2

INVENTOR
Harvey Fruish

3,751,782

INVENTOR
Harvey Fruish

THROW AWAY TIPS FOR METAL CUTTING TOOLS

This invention relates to throw-away tips for metal cutting tools.

A throw-away tip in accordance with the invention comprises a right prism of hard material, each end face of the prism having at least two identical cutting corners and being formed with a plurality of tapering recesses of V-shaped section each recess having its narrowest end adjacent one of said cutting corners of the associated end face.

IN THE ACCOMPANYING DRAWINGS

Figure 1:
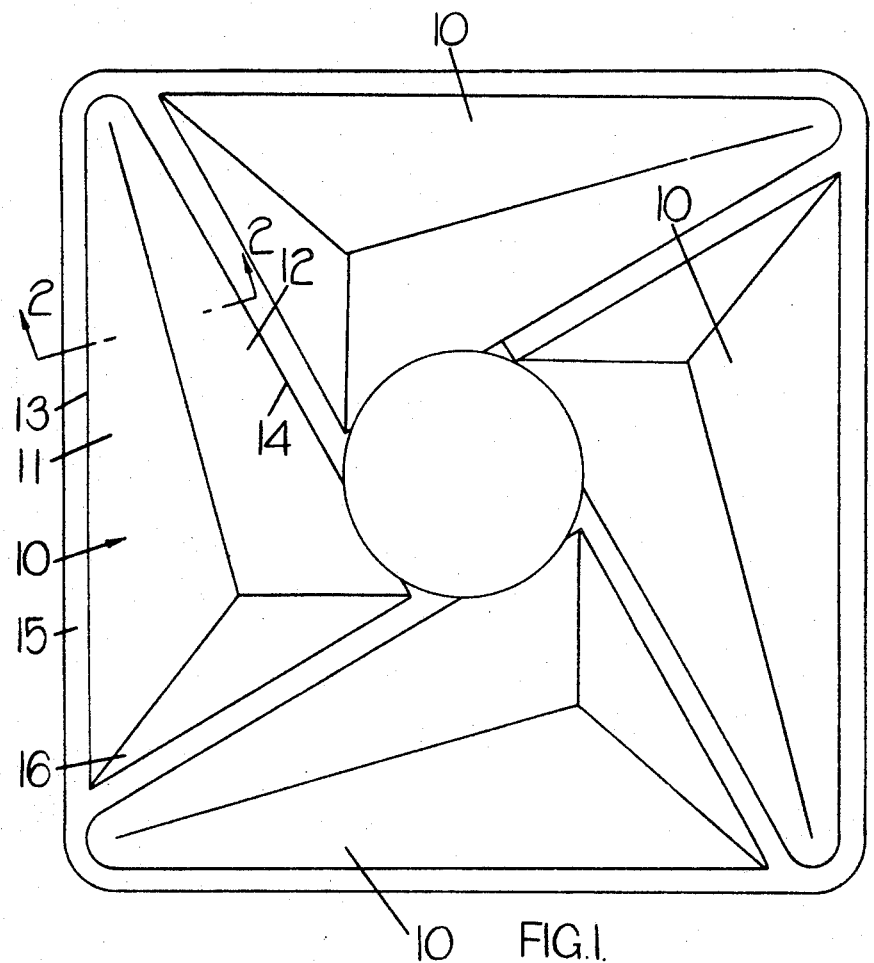
Figure 2:
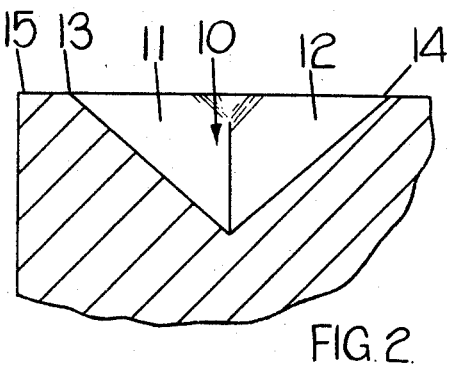
Figure 3:
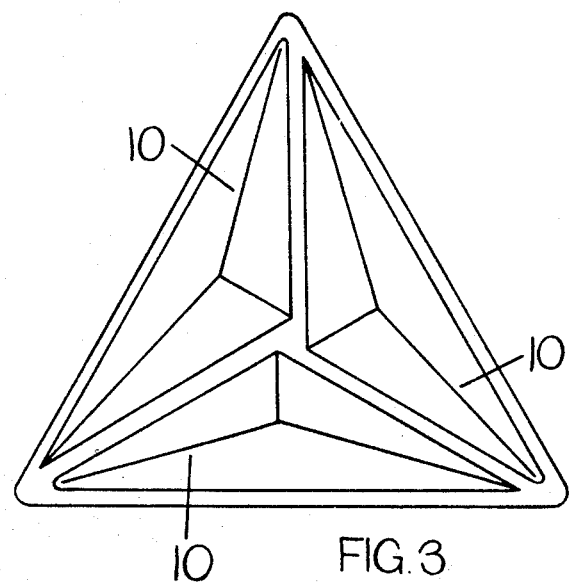
Figure 4:
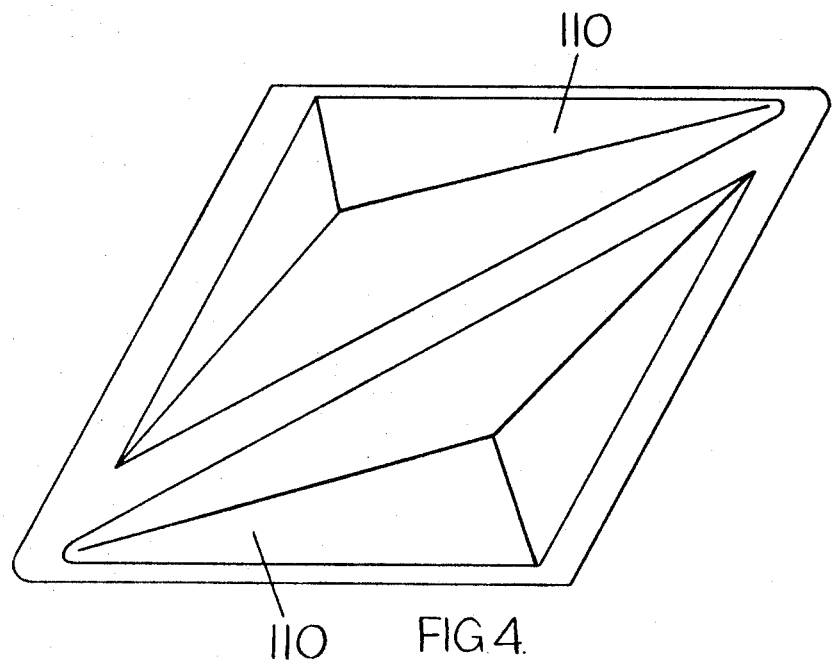

FIG. 1 is an elevation of one example of a tip in accordance with the invention, FIG. 2 is an enlarged fragmentary section on line 2—2 in FIG. 1, and FIGS. 3 and 4 are elevations of alternative forms of tip.

The tip shown is a square-section right prism and is formed of hard material such as tungsten carbide. Each end face of the prism is square and thus has four identical right-angle corners. In each end face there are formed four tapering recesses 10 of V-shaped cross-section. Each such recess 10 has its narrower end adjacent a corner of the face. One end of the recess 10 is defined by two flank surfaces 11, 12 inclined to one another at an angle in the range 105° to 110° and equally inclined to the end face. The lines 13, 14 where the flank surfaces 11, 12 intersect the end face are inclined to one another at an angle of 30° and the line 13 is parallel with one edge of the end face, leaving a land 15 at said edge. The other end of the recess is defined by an inclined end face 16.

When the tip shown is used for taking a fairly deep cut on a small diameter workpiece, the recess 10 provides sufficient clearance for the chip taken to curl around and form a continuous helical configuration. This ensures that the chip is carried away from the work and does not foul any steady rollers bearing on the work. The tip has eight identical cutting corners.

In the example shown in FIG. 3 the tip is of equilateral triangular cross-section and three recesses 10 are formed in each triangular end face, six identical cutting corners being provided.

The tip shown in FIG. 4 is of rhombic cross-section. The recesses 110 in each end face have the same basic geometry as the recesses 10.

I claim:

1. A throw away tip for a metal cutting tool comprising a right prism of a hard material, each end face of the prism having at least two identical cutting corners and being formed with a plurality of tapering recesses of V-shaped section, each such recess having its narrow end adjacent one of said cutting corners of the associated end face and being spaced from the edge of such face so as to define a land extending completely around each end face.

2. A throw-away tip as claimed in claim 1 in which each recess has a pair of flank surfaces inclined to one another at an angle in the range 105° to 110° and equally inclined to the end face.

3. A throw-away tip as claimed in claim 2 in which said flank surfaces intersect the end face on two lines inclined to one another at an angle of 30°, one line being parallel to an edge of the end face, whereby a constant width land is provided.

4. A throw-away tip as claimed in claim 3 which the prism is of square cross section and has eight identical cutting corners.

5. A throw-away tip as claimed in claim 3 in which the prism is of equilateral triangular cross-section and has six identical cutting corners.

6. A throw-away tip as claimed in claim 3 in which the prism is of rhombic cross-section and has four identical cutting corners.

7. A throw-away tip as claimed in claim 3 in which each recess is bounded at the end opposite the associated cutting corner by an inclined end face.

* * * * *